i

US008413497B2

(12) United States Patent
Kayama et al.

(10) Patent No.: US 8,413,497 B2
(45) Date of Patent: Apr. 9, 2013

(54) ABNORMALITY DIAGNOSTIC DEVICE OF INTERNAL COMBUSTION ENGINE WITH TURBOCHARGER

(75) Inventors: Ryozo Kayama, Kariya (JP); Toshihiko Tanaka, Kariya (JP); Masahiro Kubo, Kariya (JP)

(73) Assignee: Denso Corporation, Kariya (JP)

( * ) Notice: Subject to any disclaimer, the term of this patent is extended or adjusted under 35 U.S.C. 154(b) by 120 days.

(21) Appl. No.: 13/044,021

(22) Filed: Mar. 9, 2011

(65) Prior Publication Data
US 2011/0219861 A1 Sep. 15, 2011

(30) Foreign Application Priority Data
Mar. 9, 2010 (JP) .................................. 2010-51444

(51) Int. Cl.
*G01M 15/10* (2006.01)
(52) U.S. Cl.
USPC ...................................................... 73/114.72
(58) Field of Classification Search ................. 73/114.72
See application file for complete search history.

(56) References Cited

U.S. PATENT DOCUMENTS

| 7,770,393 | B2* | 8/2010 | Buckland et al. | 60/605.1 |
| 7,801,665 | B2* | 9/2010 | Buckland et al. | 701/103 |
| 7,802,563 | B2* | 9/2010 | Behr et al. | 123/692 |
| 7,987,040 | B2* | 7/2011 | Buckland et al. | 701/103 |
| 2005/0172628 | A1* | 8/2005 | Fukasawa et al. | 60/602 |
| 2009/0018751 | A1* | 1/2009 | Buckland et al. | 701/103 |
| 2009/0241925 | A1* | 10/2009 | Behr et al. | 123/690 |
| 2011/0239984 | A1* | 10/2011 | Lee et al. | 123/339.14 |
| 2012/0185157 | A1* | 7/2012 | Tsunooka | 701/105 |
| 2012/0215425 | A1* | 8/2012 | Storhok et al. | 701/105 |

FOREIGN PATENT DOCUMENTS

| JP | 1-237336 | 9/1989 |
| JP | 2005-133626 | 5/2005 |
| JP | 2009-235920 | 10/2009 |

* cited by examiner

*Primary Examiner* — Freddie Kirkland, III
(74) *Attorney, Agent, or Firm* — Nixon & Vanderhye P.C.

(57) ABSTRACT

When a wastegate valve, which opens and closes an exhaust bypass passage bypassing an exhaust turbine, is open, exhaust gases of respective cylinders bypass the exhaust turbine and pass a sensing point of an air-fuel ratio sensor downstream of the exhaust turbine. Accordingly, the exhaust gases of the respective cylinders can be avoided from being mixed by the exhaust turbine, so an influence of an inter-cylinder variation in an air-fuel ratio due to an inter-cylinder imbalance abnormality becomes apt to appear in an output waveform of the air-fuel ratio sensor. Therefore, existence or nonexistence of the inter-cylinder imbalance abnormality is determined based on the output of the air-fuel ratio sensor when the wastegate valve is open. Eventually, the existence or nonexistence of the inter-cylinder imbalance abnormality can be determined accurately, thereby improving detection accuracy of the inter-cylinder imbalance abnormality.

15 Claims, 6 Drawing Sheets

ABNORMALITY DIAGNOSTIC DEVICE OF INTERNAL COMBUSTION ENGINE WITH TURBOCHARGER

CROSS REFERENCE TO RELATED APPLICATION

This application is based on and incorporates herein by reference Japanese Patent Application No. 2010-51444 filed on Mar. 9, 2010.

BACKGROUND OF THE INVENTION

1. Field of the Invention

The present invention relates to an abnormality diagnostic device of an internal combustion engine with a turbocharger, the abnormality diagnostic device determining existence or nonexistence of an inter-cylinder imbalance abnormality based on an output of an air-fuel ratio sensor provided to an exhaust passage of the internal combustion engine.

2. Description of Related Art

Patent document 1 (JP-A-2009-235920) describes an internal combustion engine that is mounted in a vehicle and that has an exhaust turbine supercharger (i.e., turbocharger). The turbocharger has an exhaust turbine provided in an exhaust passage of the internal combustion engine and a compressor provided in an intake passage of the internal combustion engine. The exhaust turbine and the compressor are connected with each other. If the exhaust turbine is rotated with an energy of exhaust gas, the exhaust turbine rotates the compressor, thereby supercharging an intake air. Among such the internal combustion engines each having the turbocharger, there is an internal combustion engine having an air-fuel ratio sensor, which is provided downstream of the exhaust turbine in the exhaust passage in consideration of restriction on a layout of an exhaust system, heat resistance of the air-fuel ratio sensor and the like.

If imbalance among cylinders (i.e., inter-cylinder imbalance) of the internal combustion engine such as a variation in fuel injection quantity or a variation in intake air quantity among the cylinders increases, there is a possibility that a variation in the air-fuel ratio among the cylinders (i.e., inter-cylinder variation in air-fuel ratio) increases and exhaust emission deteriorates. The inventors of the present invention have been examining a system that determines existence or nonexistence of an inter-cylinder imbalance abnormality based on an output of an air-fuel ratio sensor provided to an exhaust passage of an internal combustion engine. For example, the inter-cylinder imbalance abnormality includes an abnormality that the inter-cylinder variation in the air-fuel ratio exceeds a permissible level. In the course of the study, a following problem has been newly revealed.

In the system having the air-fuel ratio sensor provided downstream of the exhaust turbine in the internal combustion engine with the turbocharger, when the exhaust gases of the respective cylinders pass through the exhaust turbine, the exhaust gases of the respective cylinders are mixed by the exhaust turbine, and then the exhaust gases pass a sensing point of the air-fuel ratio sensor. Accordingly, an influence of the inter-cylinder variation in the air-fuel ratio due to the inter-cylinder imbalance abnormality becomes less apt to appear in an output waveform of the air-fuel ratio sensor. Therefore, there occurs a problem that it becomes difficult to accurately determine the existence or nonexistence of the inter-cylinder imbalance abnormality even if the output of the air-fuel ratio sensor is monitored. As a result, detection accuracy of the inter-cylinder imbalance abnormality deteriorates.

SUMMARY OF THE INVENTION

It is an object of the present invention to provide an abnormality diagnostic device of an internal combustion engine with a turbocharger, the abnormality diagnostic device being capable of accurately determining existence or nonexistence of an inter-cylinder imbalance abnormality based on an output of an air-fuel ratio sensor provided downstream of an exhaust turbine and capable of improving detection accuracy of the inter-cylinder imbalance abnormality.

According to a first example aspect of the present invention, an abnormality diagnostic device is applied to an internal combustion engine with a turbocharger having a turbocharger, which is used for supercharging an intake air by driving a compressor with the use of an exhaust turbine provided in an exhaust passage of the internal combustion engine, and a wastegate valve (WGV), which is used for opening and closing an exhaust bypass passage bypassing the exhaust turbine. The abnormality diagnostic device has an abnormality diagnosing section for performing inter-cylinder imbalance abnormality diagnosis for determining existence or nonexistence of an imbalance abnormality among cylinders of the internal combustion engine based on an output of an air-fuel ratio sensor provided downstream of the exhaust turbine in the exhaust passage. The abnormality diagnosing section performs the inter-cylinder imbalance abnormality diagnosis when the wastegate valve is open.

In the system in which the air-fuel ratio sensor is arranged downstream of the exhaust turbine, when the wastegate valve is open, exhaust gases of respective cylinders bypass the exhaust turbine and pass a sensing point of the air-fuel ratio sensor provided downstream of the exhaust turbine. Therefore, the exhaust gases of the respective cylinders can be avoided from being mixed by the exhaust turbine. As a result, an influence of the inter-cylinder variation in the air-fuel ratio due to the inter-cylinder imbalance abnormality becomes apt to appear in an output waveform of the air-fuel ratio sensor. Therefore, by performing the inter-cylinder imbalance abnormality diagnosis for determining the existence or nonexistence of the inter-cylinder imbalance abnormality based on the output of the air-fuel ratio sensor when the wastegate valve is open, the existence or nonexistence of the inter-cylinder imbalance abnormality can be determined with high accuracy. Eventually, the detection accuracy of the inter-cylinder imbalance abnormality can be improved. There is a tendency that regulation on the inter-cylinder imbalance will become much severer. By applying the present invention, the regulation on the inter-cylinder imbalance becoming much severer can be complied with.

The inter-cylinder imbalance abnormality diagnosis may be performed when the wastegate valve is opened by supercharging pressure control, which is for controlling the supercharging pressure by controlling an opening degree of the wastegate valve and thereby controlling the rotation of the exhaust turbine, or the like.

Alternatively, as in a second example aspect of the present invention, the abnormality diagnosing section may have a section for compulsorily opening the wastegate valve when the abnormality diagnosing section performs the inter-cylinder imbalance abnormality diagnosis. With such the construction, the inter-cylinder imbalance abnormality diagnosis can be performed by compulsorily opening the wastegate valve. Thus, execution frequency of the inter-cylinder imbalance abnormality diagnosis can be increased. Accordingly, if the inter-cylinder imbalance abnormality occurs, the inter-cylinder imbalance abnormality can be detected in an early stage.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, embodiments of the present invention will be described with reference to the drawings.

First Embodiment

Hereafter, a first embodiment of the present invention will be described with reference to FIGS. 1 to 7. First, a general configuration of an entire engine control system according to the present embodiment will be explained with reference to FIG. 1. An air cleaner 13 is provided in the most upstream portion of an intake pipe 12 of an engine 11, which is an internal combustion engine. An airflow meter 14 for sensing an intake air quantity is provided downstream of the air cleaner 13. A compressor 27 of an exhaust gas supercharger 25 (hereafter, turbocharger) and an intercooler 31 for cooling an intake air pressurized by the compressor 27 are provided downstream of the airflow meter 14. A throttle valve 15, whose opening degree (throttle opening degree) is adjusted by a motor or the like, and a throttle position sensor 16 for sensing the opening degree of the throttle valve 15 are provided downstream of the intercooler 31.

Figure 1:
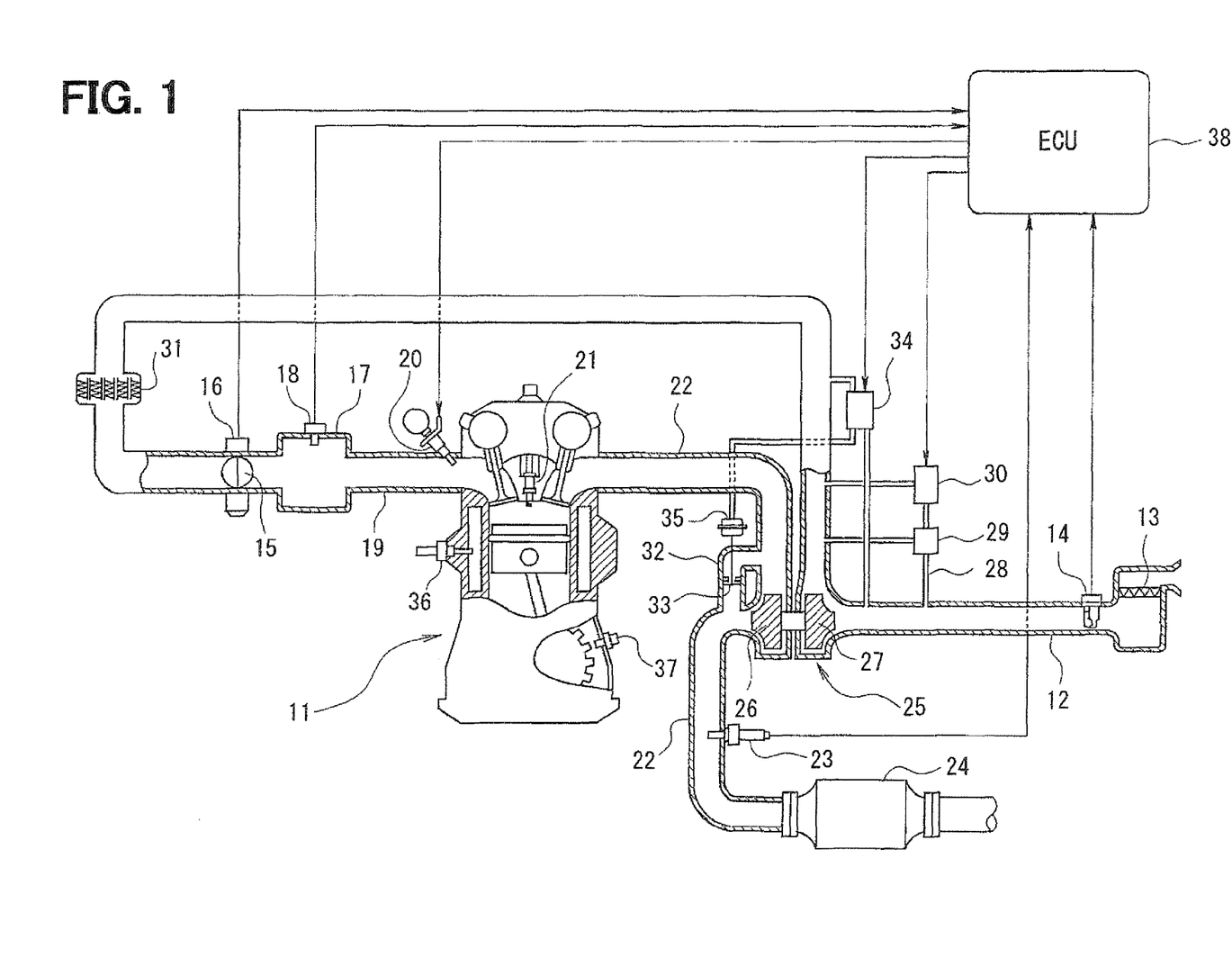
FIG. 1 is a schematic configuration diagram showing an engine control system according to a first embodiment of the present invention.

A surge tank 17 is provided downstream of the throttle valve 15, and an intake pressure sensor 18 for sensing pressure downstream of the throttle valve 15 (i.e., intake pressure) is provided to the surge tank 17. An intake manifold 19 for introducing the air into each cylinder of the engine 11 is provided to the surge tank 17. An injector 20 is attached near an inlet port of the intake manifold 19 of each cylinder. The injector 20 injects fuel toward the inlet port. Spark plugs 21 are attached to a cylinder head of the engine 11 for the respective cylinders. A mixture gas in each cylinder is ignited by a spark discharge from the spark plug 21 provided to the cylinder.

An air-fuel ratio sensor 23 for sensing an air-fuel ratio of exhaust gas is provided to an exhaust pipe 22 (exhaust passage) of the engine 11 downstream of an exhaust turbine 26 of the turbocharger 25. A catalyst 24 such as a three-way catalyst for purifying the exhaust gas is provided downstream of the air-fuel ratio sensor 23.

The turbocharger 25 is mounted to the engine 11. The exhaust turbine 26 of the turbocharger 25 is provided upstream of the air-fuel ratio sensor 23 in the exhaust pipe 22. The compressor 27 of the turbocharger 25 is provided between the airflow meter 14 and the throttle valve 15 in the intake pipe 12. The exhaust turbine 26 and the compressor 27 of the turbocharger 25 are connected with each other. If the exhaust turbine 26 is rotated with a kinetic energy of the exhaust gas, the exhaust turbine 26 rotates the compressor 27, thereby supercharging the intake air.

An intake bypass passage 28 is provided to the intake pipe 12 upstream of the throttle valve 15 for providing a bypass between an upstream side and a downstream side of the compressor 27. An air bypass valve 29 (ABV) for opening and closing the intake bypass passage 28 is provided to a middle of the intake bypass passage 28. The opening and closing action of the ABV 29 is controlled by controlling a vacuum switching valve 30 of the ABV 29.

An exhaust bypass passage 32 is provided to the exhaust pipe 22 for providing a bypass between an upstream side and a downstream side of the exhaust turbine 26. A wastegate valve 33 (WGV) for opening and closing the exhaust bypass passage 32 is provided to a middle of the exhaust bypass passage 32. An opening degree of the WGV 33 is controlled by controlling a vacuum switching valve 34 of the WGV 33 and thereby controlling a diaphragm-type actuator 35.

A coolant temperature sensor 36 for sensing coolant temperature and a crank angle sensor 37 for outputting a pulse signal every time a crankshaft of the engine 11 rotates by a predetermined crank angle are attached to a cylinder block of the engine 11. A crank angle and engine rotation speed are sensed based on the output signal of the crank angle sensor 37.

Outputs of the above-mentioned various sensors are inputted to an engine control unit 38 (ECU). The ECU 38 is constituted mainly by a microcomputer and executes various engine control programs stored in an incorporated ROM (storage medium). Thus, the ECU 38 controls a fuel injection quantity of the injector 20 and ignition timing of the spark plug 21 in accordance with an engine operation state. Further, the ECU 38 controls an exhaust gas quantity supplied to the exhaust turbine 26 by controlling the opening degree of the WGV 33. Thus, the ECU 38 performs supercharging pressure control by controlling the rotation of the exhaust turbine 26 and the compressor 27.

When a predetermined air-fuel ratio feedback control execution condition is satisfied, the ECU 38 calculates an air-fuel ratio feedback correction amount to conform the air-fuel ratio of the exhaust gas to a target air-fuel ratio (for example, theoretical air-fuel ratio) based on the output of the air-fuel ratio sensor 23. The ECU 38 performs air-fuel ratio feedback control for correcting the fuel injection quantity of the injector 20 by using the air-fuel ratio feedback correction amount.

Figure 2:
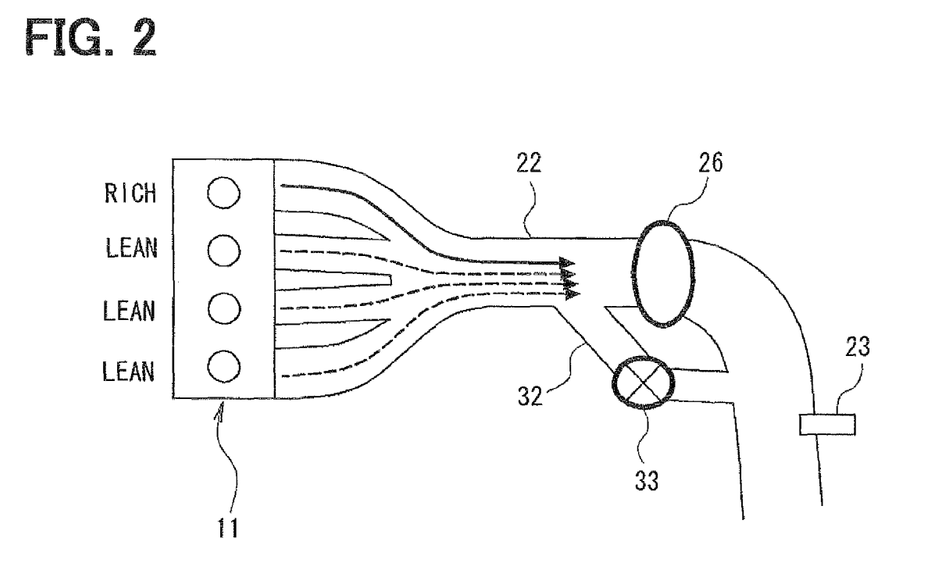
FIG. 2 is a diagram illustrating a state where an inter-cylinder imbalance abnormality occurs in the system according to the first embodiment.

If imbalance among the cylinders (i.e., inter-cylinder imbalance) of the engine 11 such as a variation in the fuel injection quantity or a variation in the intake air quantity among the cylinders enlarges, there is a possibility that a variation in the air-fuel ratio among the cylinders (i.e., inter-cylinder variation in air-fuel ratio) increases and exhaust emission deteriorates. For example, as shown in FIG. 2, if an abnormality, in which the fuel injection quantity of a certain cylinder varies to a larger quantity, occurs and the air-fuel ratio of the abnormal cylinder becomes rich, the air-fuel ratio sensed with the air-fuel ratio sensor 23 (i.e., average air-fuel ratio of cylinders) changes to a richer value. Accordingly, the fuel injection quantities of the respective cylinders are corrected by the air-fuel ratio feedback control into leaner values (i.e., smaller fuel injection quantities) to conform the air-fuel ratio, which is sensed with the air-fuel ratio sensor 23 (i.e., average air-fuel ratio of cylinders), to the target air-fuel ratio. In this case, the air-fuel ratio is controlled to be rich in the abnormal cylinder, and the air-fuel ratio is controlled to be lean in the other cylinders. Therefore, as compared to a normal case where all the cylinders are controlled to the theoretical air-fuel ratio (i.e., stoichiometric air-fuel ratio), a large quantity of rich components (HC and the like) are discharged from the abnormal cylinder, and a large quantity of lean components (NOx and the like) are discharged from the other cylinders. As a result, the exhaust emission deteriorates.

Figure 5:
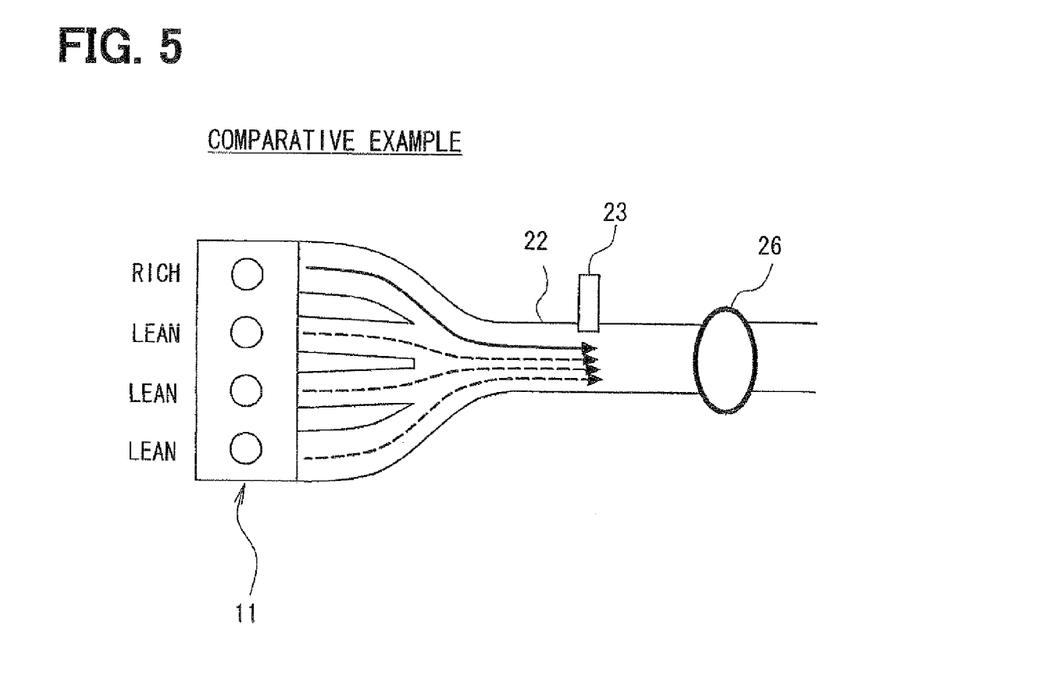
FIG. 5 is a diagram illustrating a state where an inter-cylinder imbalance abnormality occurs in a system of a comparative example.
Figure 6:
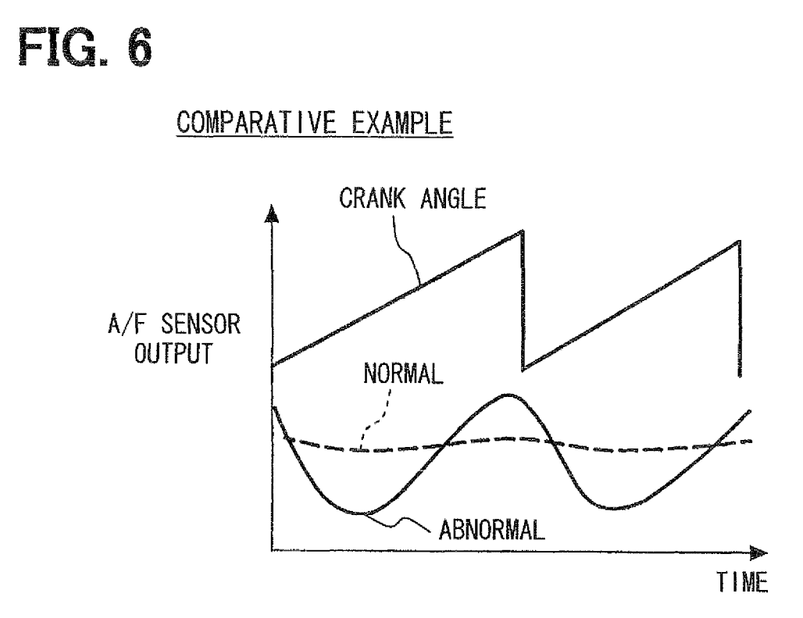
FIG. 6 is a time chart showing an output waveform of an air-fuel ratio sensor of the system of the comparative example.

FIG. 5 shows a system of a comparative example, in which the air-fuel ratio sensor 23 is provided upstream of the exhaust turbine 26. In such the system shown in FIG. 5, the exhaust gases of the respective cylinders pass the sensing point of the air-fuel ratio sensor 23 before the exhaust gases are mixed by the exhaust turbine 26. Therefore, an influence of the inter-cylinder variation in the air-fuel ratio due to the inter-cylinder imbalance abnormality is apt to appear in an output waveform of the air-fuel ratio sensor 23 as shown in FIG. 6. Therefore, the existence or nonexistence of the inter-cylinder imbalance abnormality can be determined with high accuracy by monitoring the output of the air-fuel ratio sensor 23.

Figure 3:
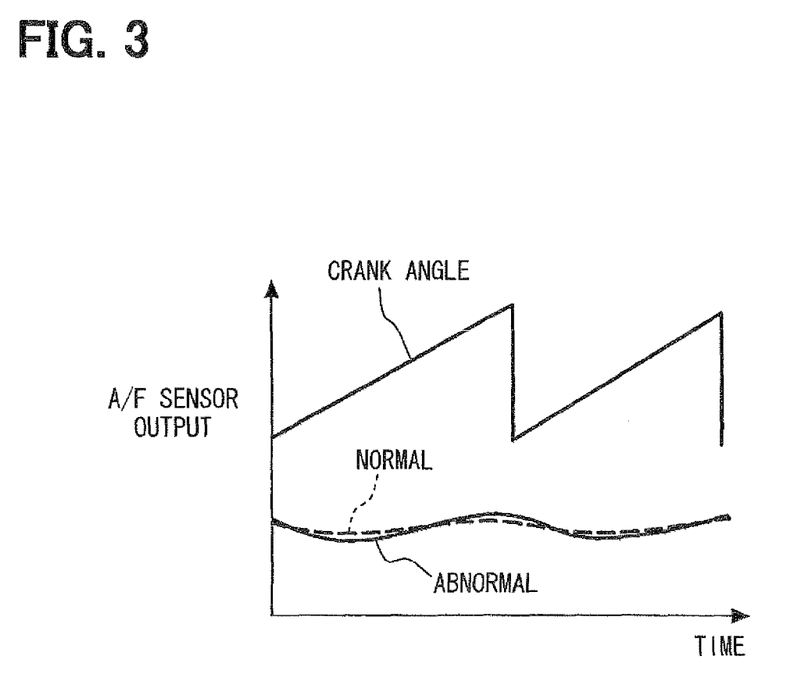
FIG. 3 is a time chart showing an output waveform of an air-fuel ratio sensor at the time when a WGV is closed according to the first embodiment.

As contrasted thereto, in the system shown in FIG. 2 in which the air-fuel ratio sensor 23 is provided downstream of the exhaust turbine 26, when the WGV 33 is closed and the exhaust gases of the respective cylinders pass through the exhaust turbine 26, the exhaust gases pass the sensing point of the air-fuel ratio sensor 23 after the exhaust gases of the respective cylinders are mixed by the exhaust turbine 26. Therefore, the influence of the inter-cylinder variation in the air-fuel ratio due to the inter-cylinder imbalance abnormality becomes less apt to appear in the output waveform of the air-fuel ratio sensor 23 as shown in FIG. 3. Therefore, it is difficult to accurately determine the existence or nonexistence of the inter-cylinder imbalance abnormality even if the output of the air-fuel ratio sensor 23 is monitored.

Figure 7:
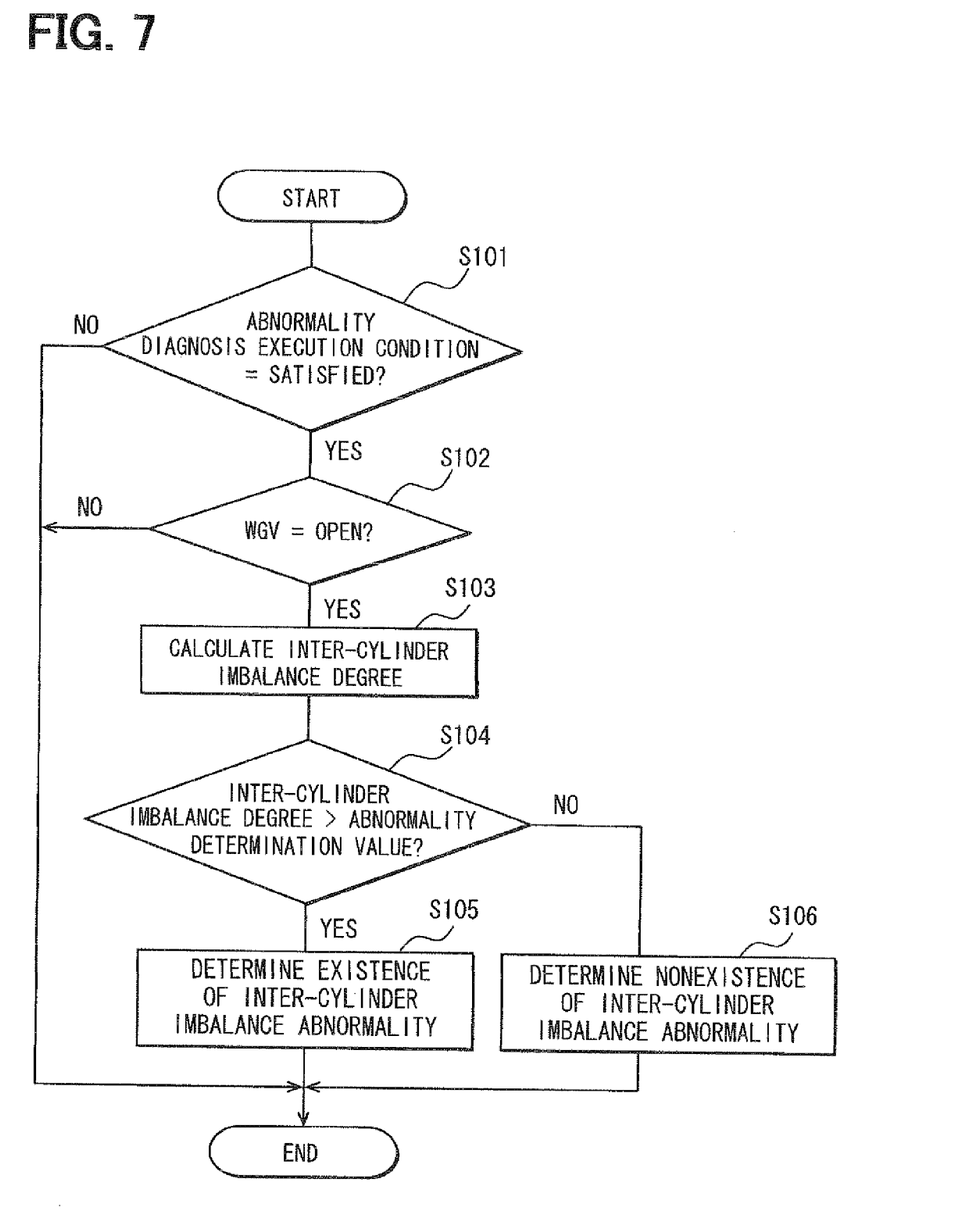
FIG. 7 is a flowchart showing a processing flow of an inter-cylinder imbalance abnormality diagnostic routine according to the first embodiment.

Therefore, according to the present embodiment, in the system in which the air-fuel ratio sensor 23 is provided downstream of the exhaust turbine 26, the ECU 38 performs an inter-cylinder imbalance abnormality diagnostic routine shown in FIG. 7. Thus, inter-cylinder imbalance abnormality diagnosis for determining the existence or nonexistence of the inter-cylinder imbalance abnormality is performed based on the output of the air-fuel ratio sensor 23 when the WGV 33 is open. For example, the inter-cylinder imbalance abnormality includes an abnormality that the inter-cylinder variation in the air-fuel ratio exceeds a permissible level.

Figure 4:
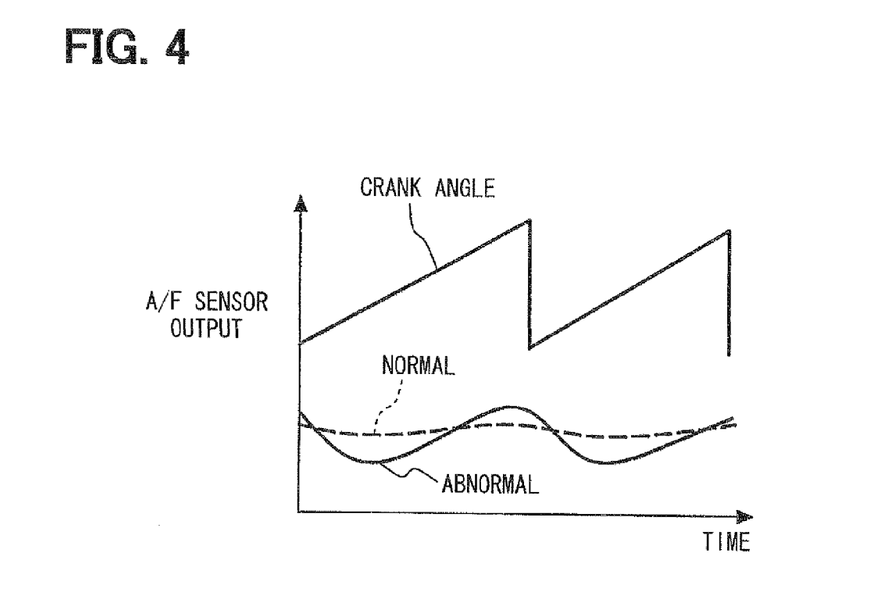
FIG. 4 is a time chart showing an output waveform of the air-fuel ratio sensor at the time when the WGV is opened according to the first embodiment.

When the WGV 33 is open in the system in which the air-fuel ratio sensor 23 is provided downstream of the exhaust turbine 26, the exhaust gases of the respective cylinders bypass the exhaust turbine 26 and pass the sensing point of the air-fuel ratio sensor 23 provided downstream of the exhaust turbine 26. Therefore, the exhaust gases of the respective cylinders can be avoided from being mixed by the exhaust turbine 26. As a result, the influence of the inter-cylinder variation in the air-fuel ratio due to the inter-cylinder imbalance abnormality becomes more apt to appear in the output waveform of the air-fuel ratio sensor 23 as shown in FIG. 4. Therefore, by performing the inter-cylinder imbalance abnormality diagnosis for determining the existence or nonexistence of the inter-cylinder imbalance abnormality based on the output of the air-fuel ratio sensor 23 when the WGV 33 is open, the existence or nonexistence of the inter-cylinder imbalance abnormality can be determined with high accuracy.

Hereafter, processing contents of the inter-cylinder imbalance abnormality diagnostic routine of FIG. 7 executed by the ECU 38 will be explained. The inter-cylinder imbalance abnormality diagnostic routine shown in FIG. 7 is repeatedly performed in a predetermined cycle while power supply to the ECU 38 is ON. The inter-cylinder imbalance abnormality diagnostic routine provides the function of the abnormality diagnosing section. If the routine is started, first in S101 (S means "Step"), it is determined whether an execution condition of the inter-cylinder imbalance abnormality diagnosis is satisfied. For example, the execution condition of the inter-cylinder imbalance abnormality diagnosis is satisfied when all of following conditions (i) to (iii) are satisfied.

(i) The air-fuel ratio sensor 23 has been activated.
(ii) The engine 11 is in a steady operation state.
(iii) The engine operation state is in a high load area or a low rotation area.

The high load area is an operation area where the exhaust gas quantities discharged from the respective cylinders increase and the influence of the inter-cylinder imbalance abnormality becomes more apt to appear in the output waveform of the air-fuel ratio sensor 23. The low rotation area is an operation area where an interval of the discharge of the exhaust gases from the respective cylinders lengthens and the influence of the inter-cylinder imbalance abnormality becomes more apt to appear in the output waveform of the air-fuel ratio sensor 23. Therefore, the above-described condition (iii) is set as one of the conditions constituting the execution condition of the inter-cylinder imbalance abnormality diagnosis. The above-described condition (iii) may be modified arbitrarily. For example, the condition (iii) may be a condition that the engine operation state is in the high load area. Alternatively, the condition (iii) may be a condition that the engine operation state is in the low rotation area. Alternatively, the condition (iii) may be a condition that the engine operation state is in the high load area and in the low rotation area.

If all of the above-described conditions (i) to (iii) are satisfied, the execution condition of the inter-cylinder imbalance abnormality diagnosis is satisfied. If at least one of the above-described conditions (i) to (iii) is not satisfied, the execution condition of the inter-cylinder imbalance abnormality diagnosis is not satisfied. The execution condition of the inter-cylinder imbalance abnormality diagnosis may be modified arbitrarily. When it is determined that the execution condition of the inter-cylinder imbalance abnormality diagnosis is not satisfied in S101, the routine is ended without performing processing from S102.

When it is determined that the execution condition of the inter-cylinder imbalance abnormality diagnosis is satisfied in S101, the processing from S102 is performed as follows. First in S102, it is determined whether the WGV 33 has been opened by the supercharging pressure control or the like. In S102, it may be determined whether the WGV 33 has been opened to a full-open position. Alternatively, it may be determined whether the WGV 33 has been opened to or over a predetermined opening degree, above which the influence of the inter-cylinder imbalance abnormality becomes apt to appear in the output waveform of the air-fuel ratio sensor 23.

When it is determined that the WGV 33 is open in S102, the process proceeds to S103, in which an inter-cylinder imbalance degree is calculated based on the output of the air-fuel ratio sensor 23. The inter-cylinder imbalance degree is information used for evaluating a degree of the inter-cylinder imbalance. For example, either one of following parameters (a) to (e) may be calculated as the inter-cylinder imbalance degree.

(a) Amplitude of the output waveform of the air-fuel ratio sensor 23, i.e., a difference between a peak value and a bottom value in a predetermined period.

(b) An area of the output waveform of the air-fuel ratio sensor 23, i.e., an area surrounded by the output waveform in a predetermined period and an output waveform in a normal case.

(c) A gradient of the output waveform of the air-fuel ratio sensor 23, i.e., an amount or a ratio of change of the output waveform in a predetermined period.

(d) Length of the output waveform of the air-fuel ratio sensor 23, i.e., trajectory length in a predetermined period.

(e) Frequency of the output waveform of the air-fuel ratio sensor 23.

If the inter-cylinder imbalance increases and the inter-cylinder variation in the air-fuel ratio increases, fluctuation of the output of the air-fuel ratio sensor 23 increases and the amplitude, the area, the gradient, the length, the frequency and the like of the output of the air-fuel ratio sensor 23 increase. Therefore, each of these parameters serves as information accurately reflecting the degree of the inter-cylinder imbalance.

Then, the process proceeds to S104, in which it is determined whether the inter-cylinder imbalance degree is higher than a predetermined abnormality determination value. The abnormality determination value may be a preset fixed value. Alternatively, the abnormality determination value may be varied according to the engine operation state and the like.

If it is determined in S104 that the inter-cylinder imbalance degree is higher than the abnormality determination value, the process proceeds to S105, in which it is determined that the inter-cylinder imbalance abnormality exists and an abnormality flag is set at ON. Further, in S105, a warning lamp (not shown) provided in an instrument panel at a driver's seat is lit or an alarm is displayed in an alarm display section (not shown) of the instrument panel to give a warning to the driver. Moreover, in S105, abnormality information (abnormality code or the like) is stored in a rewritable nonvolatile memory (rewritable memory that holds stored data even while power supply of ECU 38 is OFF) such as a backup RAM (not shown) of the ECU 38. Then, the present routine is ended.

When it is determined in S104 that the inter-cylinder imbalance degree is equal to or lower than the abnormality determination value, the process proceeds to S106, in which it is determined that the inter-cylinder imbalance abnormality does not exist (i.e., normality is determined), and the abnormality flag is maintained at OFF. Then, the present routine is ended.

In the system in which the air-fuel ratio sensor 23 is provided downstream of the exhaust turbine 26, when the WGV 33 is open, the influence of the inter-cylinder variation in the air-fuel ratio due to the inter-cylinder imbalance abnormality becomes more apt to appear in the output waveform of the air-fuel ratio sensor 23. According to the above-described first embodiment taking this point into account, the inter-cylinder imbalance abnormality diagnosis for determining the existence or nonexistence of the inter-cylinder imbalance abnormality based on the output of the air-fuel ratio sensor 23 is performed when the WGV 33 is opened by the supercharging pressure control or the like. Therefore, the existence or nonexistence of the inter-cylinder imbalance abnormality can be determined with high accuracy base on the output of the air-fuel ratio sensor 23. Eventually, the detection accuracy of the inter-cylinder imbalance abnormality can be improved. There is a tendency that regulation on the inter-cylinder imbalance will become much severer. By applying the present invention, the regulation on the inter-cylinder imbalance becoming much severer can be complied with.

Second Embodiment

Next, a second embodiment of the present invention will be described with reference to FIG. 8. In the following description, differences from the first embodiment will be mainly explained.

In the above-described first embodiment, the inter-cylinder imbalance abnormality diagnosis is performed when the WGV 33 is opened by the supercharging pressure control or the like. In the second embodiment, an inter-cylinder imbalance abnormality diagnostic routine shown in FIG. 8 is performed by the ECU 38. Thus, the WGV 33 is opened compulsorily when the inter-cylinder imbalance abnormality diagnosis is performed. In the routine of FIG. 8, the processing of S102 of the routine of the first embodiment shown in FIG. 7 is replaced with processing of S102a. The other processing of FIG. 8 is the same as the processing of FIG. 7.

Figure 8:
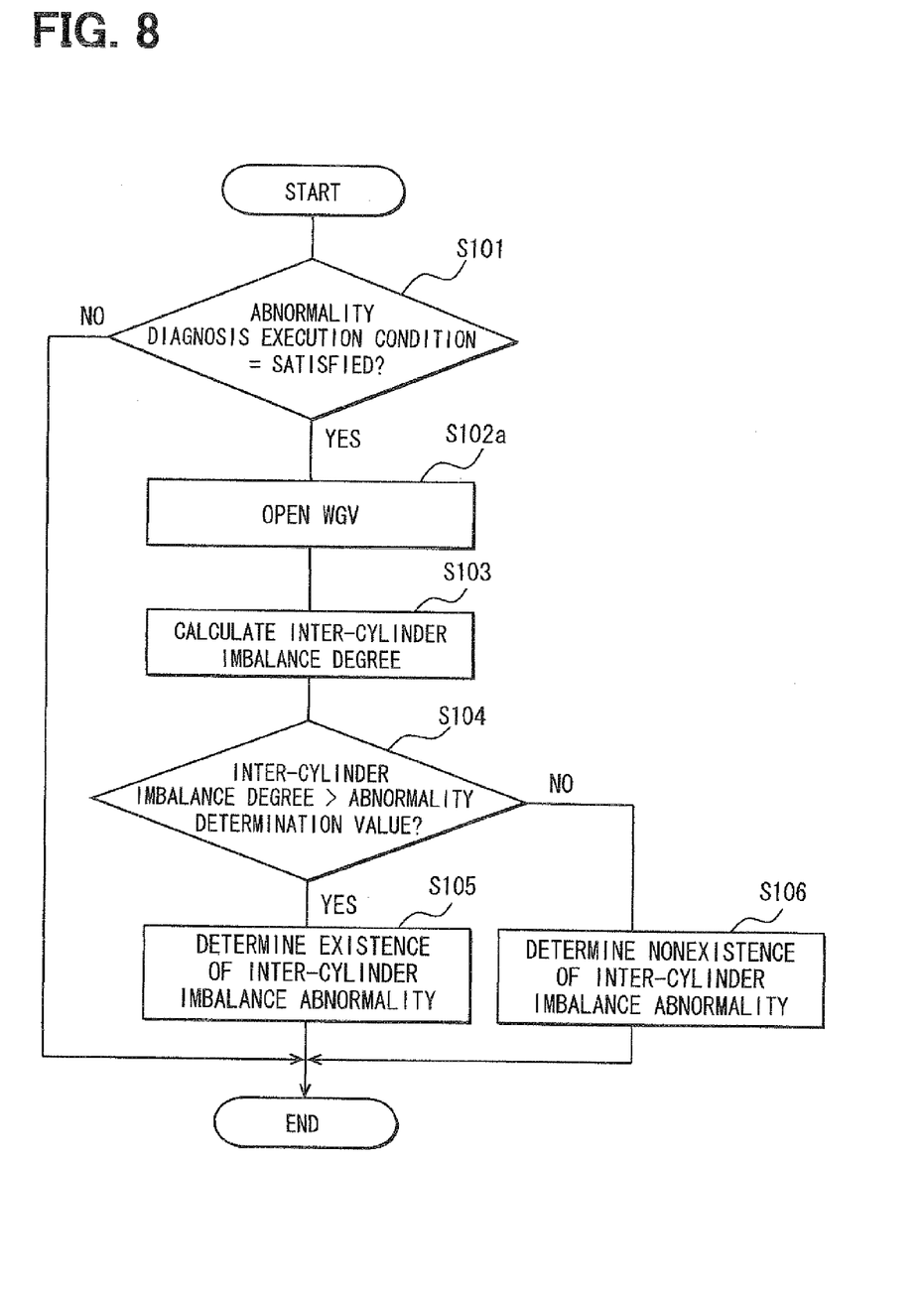
FIG. 8 is a flowchart showing a processing flow of an inter-cylinder imbalance abnormality diagnostic routine according to a second embodiment of the present invention.

In the inter-cylinder imbalance abnormality diagnostic routine of FIG. 8, when it is determined in S101 that the execution condition of the inter-cylinder imbalance abnormality diagnosis is satisfied, the process proceeds to S102a, in which the WGV 33 is opened compulsorily. In this case, the WGV 33 may be opened to the full-open position. Alternatively, the WGV 33 may be opened to or over the predetermined opening degree, above which the influence of the inter-cylinder imbalance abnormality becomes apt to appear in the output waveform of the air-fuel ratio sensor 23.

Then, the inter-cylinder imbalance degree is calculated based on the output of the air-fuel ratio sensor 23 in S103. It is determined whether the inter-cylinder imbalance degree is higher than the abnormality determination value in S104. If it is determined in S104 that the inter-cylinder imbalance degree is higher than the abnormality determination value, the process proceeds to S105, in which it is determined that the inter-cylinder imbalance abnormality exists. If it is determined in S104 that the inter-cylinder imbalance degree is equal to or lower than the abnormality determination value, the process proceeds to S106, in which it is determined that the inter-cylinder imbalance abnormality does not exist (i.e., normality is determined).

According to the above-described second embodiment, when the execution condition of the inter-cylinder imbalance abnormality diagnosis is satisfied, the WGV 33 is opened compulsorily and the inter-cylinder imbalance abnormality diagnosis is performed. Therefore, execution frequency of the inter-cylinder imbalance abnormality diagnosis can be increased. Accordingly, if the inter-cylinder imbalance abnormality occurs, the inter-cylinder imbalance abnormality can be detected in an early stage.

The concrete method of the inter-cylinder imbalance abnormality diagnosis for determining the existence or nonexistence of the inter-cylinder imbalance abnormality based on the output of the air-fuel ratio sensor 23 is not limited to the method explained in the above-described first or second embodiment but may be modified arbitrarily. For example, the air-fuel ratio of each cylinder may be estimated for each cylinder based on the output of the air-fuel ratio sensor 23. Then, the existence or nonexistence of the inter-cylinder imbalance abnormality may be determined based on the estimation result.

The present invention is not limited to the inlet port injection engine shown in FIG. 1. Alternatively, the present invention may be applied to a direction injection engine or a dual injection engine having both of an injector for inlet port injection and an injector for direct injection.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An abnormality diagnostic device of an internal combustion engine with a turbocharger having a turbocharger, which is used for supercharging an intake air by driving a compressor with the use of an exhaust turbine provided in an exhaust passage of the internal combustion engine, a wastegate valve, which is used for opening and closing an exhaust bypass passage bypassing the exhaust turbine, and a catalyst for purifying exhaust gas, the abnormality diagnostic device comprising:
    abnormality diagnosing means for performing inter-cylinder imbalance abnormality diagnosis for determining existence or nonexistence of an imbalance abnormality among cylinders of the internal combustion engine based on an output of an air-fuel ratio sensor provided downstream of the exhaust turbine and upstream of the catalyst in the exhaust passage, wherein
    the abnormality diagnosing means performs the inter-cylinder imbalance abnormality diagnosis when the wastegate valve is open.

2. The abnormality diagnostic device as in claim 1, wherein the abnormality diagnosing means has means for compulsorily opening the wastegate valve when the abnormality diagnosing means performs the inter-cylinder imbalance abnormality diagnosis.

3. The abnormality diagnostic device as in claim 1, wherein the imbalance abnormality among the cylinders is an abnormality that a variation among air-fuel ratios of the cylinders is higher than a permissible level.

4. The abnormality diagnostic device as in claim 1, wherein the abnormality diagnosing means performs the inter-cylinder imbalance abnormality diagnosis when an operation state of the internal combustion engine is in a high load area or a low rotation area.

5. The abnormality diagnostic device as in claim 1, wherein the abnormality diagnosing means performs the inter-cylinder imbalance abnormality diagnosis when the wastegate valve is opened to or over a predetermined opening degree, above which influence of inter-cylinder imbalance abnormality becomes apt to appear in a waveform of the output of the air-fuel ratio sensor.

6. An abnormality diagnostic device of an internal combustion engine with a turbocharger having a turbocharger, which is used for supercharging an intake air by driving a compressor with the use of an exhaust turbine provided in an exhaust passage of the internal combustion engine, a wastegate valve, which is used for opening and closing an exhaust bypass passage bypassing the exhaust turbine, and a catalyst for purifying exhaust gas, the abnormality diagnostic device comprising:
    a processing system, including a computer processor, configured to:
        perform, when the wastegate valve is open, inter-cylinder imbalance abnormality diagnosis for determining existence or nonexistence of an imbalance abnormality among cylinders of the internal combustion engine based on an output of an air-fuel ratio sensor provided downstream of the exhaust turbine and upstream of the catalyst in the exhaust passage.

7. The abnormality diagnostic device as in claim 6, wherein the processing system further configured to compulsorily open the wastegate valve when the inter-cylinder imbalance abnormality diagnosis is performed.

8. The abnormality diagnostic device as in claim 6, wherein the imbalance abnormality among the cylinders is an abnormality that a variation among air-fuel ratios of the cylinders is higher than a permissible level.

9. The abnormality diagnostic device as in claim 6, wherein the processing system further configured to perform the inter-cylinder imbalance abnormality diagnosis when an operation state of the internal combustion engine is in a high load area or a low rotation area.

10. The abnormality diagnostic device as in claim 6, wherein the processing system further configured to perform the inter-cylinder imbalance abnormality diagnosis when the wastegate valve is opened to or over a predetermined opening degree, above which influence of inter-cylinder imbalance abnormality becomes apt to appear in a waveform of the output of the air-fuel ratio sensor.

11. A method of diagnosing an abnormality of an internal combustion engine with a turbocharger having a turbocharger, which is used for supercharging an intake air by driving a compressor with the use of an exhaust turbine provided in an exhaust passage of the internal combustion engine, a wastegate valve, which is used for opening and closing an exhaust bypass passage bypassing the exhaust turbine, and a catalyst for purifying exhaust gas, the method comprising:
    performing, when the wastegate valve is open, inter-cylinder imbalance abnormality diagnosis for determining existence or nonexistence of an imbalance abnormality among cylinders of the internal combustion engine based on an output of an air-fuel ratio sensor provided downstream of the exhaust turbine and upstream of the catalyst in the exhaust passage.

12. The method as in claim 11, wherein the wastegate valve is compulsorily opened when the inter-cylinder imbalance abnormality diagnosis is performed.

13. The method as in claim 11, wherein
    the imbalance abnormality among the cylinders is an abnormality that a variation among air-fuel ratios of the cylinders is higher than a permissible level.

14. The method as in claim 11, wherein the inter-cylinder imbalance abnormality diagnosis is performed when an operation state of the internal combustion engine is in a high load area or a low rotation area.

15. The method as in claim 11, wherein the inter-cylinder imbalance abnormality diagnosis is performed when the wastegate valve is opened to or over a predetermined opening degree, above which influence of inter-cylinder imbalance abnormality becomes apt to appear in a waveform of the output of the air-fuel ratio sensor.

* * * * *